United States Patent [19]
Laberteaux et al.

[11] Patent Number: 6,031,908
[45] Date of Patent: Feb. 29, 2000

[54] ECHO CANCELLER EMPLOYING DUAL-H ARCHITECTURE HAVING VARIABLE ADAPTIVE GAIN SETTINGS

[75] Inventors: Kenneth P. Laberteaux, South Bend; Richard C. Younce, Wakarush, both of Ind.; Bruce E. Dunne, Naperville; David S. Farrell, Lisle, both of Ill.

[73] Assignee: Tellabs Operations, Inc., Lisle, Ill.

[21] Appl. No.: 08/970,874

[22] Filed: Nov. 14, 1997

[51] Int. Cl.[7] .................................................. H04M 1/00
[52] U.S. Cl. ........................... 379/410; 379/406; 379/411
[58] Field of Search .................................. 379/410, 406, 379/411, 3; 370/286, 290, 291

[56] References Cited

U.S. PATENT DOCUMENTS

| | | | |
|---|---|---|---|
| 3,787,645 | 1/1974 | Ochiai et al. | 179/170.2 |
| 4,064,378 | 12/1977 | Kitayama et al. | 179/170.2 |
| 4,554,417 | 11/1985 | Boyer | 179/170.2 |
| 4,574,166 | 3/1986 | Gritton | 179/170.2 |
| 4,608,464 | 8/1986 | Morikawa et al. | 179/170.2 |
| 4,621,172 | 11/1986 | Kanemasa et al. | 370/32.1 |
| 4,628,156 | 12/1986 | Irvin | 379/410 |
| 4,633,046 | 12/1986 | Kitayama et al. | 370/32.1 |
| 4,707,284 | 11/1987 | Goldblatt et al. | 252/32.7 |
| 4,805,215 | 2/1989 | Miller | 379/411 |
| 4,918,727 | 4/1990 | Rohrs et al. | 379/410 |
| 5,274,705 | 12/1993 | Younce et al. | 379/410 |
| 5,307,405 | 4/1994 | Sih | 379/410 |
| 5,664,011 | 9/1997 | Crochiere et al. | 379/410 |

FOREIGN PATENT DOCUMENTS

| | | | |
|---|---|---|---|
| 2202717 | 9/1988 | United Kingdom | H04B 3/23 |

*Primary Examiner*—Reinhard J. Eisenzopf
*Assistant Examiner*—Charles N. Appiah
*Attorney, Agent, or Firm*—McAndrews, Held & Malloy, Ltd.

[57] ABSTRACT

An echo canceller circuit for use in an echo canceller system is set forth that provides sensitive double-talk detection. The echo canceller circuit comprises a second digital filter having adaptive tap coefficients to simulate an echo response occurring during the call. The adaptive tap coefficients of the second digital filter are updated over the duration of the call using a Least Mean Squares process having an adaptive gain a. A channel condition detector is used to detect channel conditions during the call. The channel condition detector is responsive to detected channel conditions for changing the adaptive gain a during the call. For example, the channel condition detector may detect the presence of a double-talk condition and set the adaptive gain a to zero. Similarly, the channel condition detector may detect the occurrence of a high background noise condition and set the adaptive gain a to a level less than 1 that is dependent on the detected level of the background noise. Other similar channel conditions and corresponding adaptive gain settings may likewise be utilized.

21 Claims, 7 Drawing Sheets

ECHO CANCELLER EMPLOYING DUAL-H ARCHITECTURE HAVING VARIABLE ADAPTIVE GAIN SETTINGS

CROSS-REFERENCE TO RELATED APPLICATIONS

The following applications, filed on even date, herewith, are incorporated by reference: Ser. No. 08/970,230, "Echo Canceller Employing Dual-H Architecture Having Improved Coefficient Transfer"; Ser. No. 08/971,116, "Echo Canceller Employing Dual-H Architecture Having Improved Double-Talk Detection"; Ser. No. 08/970,228, "Echo Canceller Employing Dual-H Architecture Having Improved Non-Linear Echo Path Detection"; Ser. No. 08/970,639, "Echo Canceller Employing Dual-H Architecture Having Improved Non-Linear Processor"; Ser. No. 08/970,229, "Echo Canceller Employing Dual-H Architecture Having Split Adaptive Gain Settings."

STATEMENT REGARDING FEDERALLY SPONSORED RESEARCH OR DEVELOPMENT

Not Applicable

BACKGROUND OF THE INVENTION

Long distance telephone facilities usually comprise four-wire transmission circuits between switching offices in different local exchange areas, and two-wire circuits within each area connecting individual subscribers with the switching office. A call between subscribers in different exchange areas is carried over a two-wire circuit in each of the areas and a four-wire circuit between the areas, with conversion of speech energy between the two and four-wire circuits being effected by hybrid circuits. Ideally, the hybrid circuit input ports perfectly match the impedances of the two and four-wire circuits, and its balanced network impedance perfectly matches the impedance of the two-wire circuit. In this manner, the signals transmitted from one exchange area to the other will not be reflected or returned to the one area as echo. Unfortunately, due to impedance differences which inherently exist between different two and four-wire circuits, and because impedances must be matched at each frequency in the voice band, it is virtually impossible for a given hybrid circuit to perfectly match the impedances of any particular two and four-wire transmission circuit. Echo is, therefore, characteristically part of a long distance telephone system.

Although undesirable, echo is tolerable in a telephone system so long as the time delay in the echo path is relatively short, for example, shorter than about 40 milliseconds. However, longer echo delays can be distracting or utterly confusing to a far end speaker, and to reduce the same to a tolerable level an echo canceller may be used toward each end of the path to cancel echo which otherwise would return to the far end speaker. As is known, echo cancellers monitor the signals on the receive channel of a four-wire circuit and generate estimates of the actual echoes expected to return over the transmit channel. The echo estimates are then applied to a subtractor circuit in the transmit channel to remove or at least reduce the actual echo.

In simplest form, generation of an echo estimate comprises obtaining individual samples of the signal on the receive channel, convolving the samples with the impulse response of the system and then subtracting, at the appropriate time, the resulting products or echo estimates from the actual echo on the transmit channel. In actual practice generation of an echo estimate is not nearly so straightforward.

Transmission circuits, except those which are purely resistive, exhibit an impulse response which has amplitude and phase dispersive characteristics that are frequency dependent, since phase shift and amplitude attenuation vary with frequency. To this end, a suitable known technique for generating an echo estimate contemplates manipulating representations of a plurality of samples of signals which cause the echo and samples of impulse responses of the system through a convolution process to obtain an echo estimate which reasonably represents the actual echo expected on the echo path. One such system is illustrated in FIG. 1.

In the system illustrated in FIG. 1, a far end signal x from a remote telephone system is received locally at line 10. As a result of the previously noted imperfections in the local system, a portion of the signal x is echoed back to the remote site at line 15 along with the signal v from the local telephone system. The echo response is illustrated here as a signal s corresponding to the following equation:

$$s = h*x$$

where h is the impulse response of the echo characteristics. As such, the signal sent from the near end to the far end, absent echo cancellation, is the signal y, which is the sum of the telephone signal v and the echo signal s. This signal is illustrated as y at line 15 of FIG. 1.

To reduce and/or eliminate the echo signal component s from the signal y, the system of FIG. 1 uses an echo canceller having an impulse response filter $\bar{h}$ that is the estimate of the impulse echo response h. As such, a further signal $\bar{s}$ representing an estimate of echo signal s is generated by the echo canceller in accordance with the following equation:

$$\bar{s} = \bar{h}*x$$

The echo canceller subtracts the echo estimate signal $\bar{s}$ from the signal y to generate a signal e at line 20 that is returned to the far end telephone system. The signal e thus corresponds to the following equation:

$$e = s + v - \bar{s} \approx v$$

As such, the signal returned to the far end station is dominated by the signal v of the near end telephone system. As the echo impulse response $\bar{h}$ more closely correlates to the actual echo response h, then s-bar more closely approximates s and thus the magnitude of the echo signal component s on the signal e is more substantially reduced.

The echo impulse response model $\bar{h}$ may be replaced by an adaptive digital filter having an impulse response $\hat{h}$. Generally, the tap coefficients for such an adaptive response filter are found using a technique known as Normalized Least Mean Squares adaptation.

Although such an adaptive echo canceller architecture provides the echo canceller with the ability to readily adapt to changes in the echo path response h, it is highly susceptible to generating sub-optimal echo cancellation responses in the presence of "double talk" (a condition that occurs when both the speaker at the far end and the speaker at the near end are speaking concurrently as determined from the viewpoint of the echo canceller).

To reduce this sensitivity to double-talk conditions, it has been suggested to use both a non-adaptive response and an adaptive response filter in a single echo canceller. One such echo canceller is described in U.S. Pat. No. 3,787,645, issued to Ochiai et al on Jan. 22, 1974. Such an echo canceller is now commonly referred to as a dual-H echo canceller.

Although the dual-H echo canceller architecture of the '645 patent provides substantial improvements over the use of a single filter response architecture, the '645 patent is deficient in many respects and lacks certain teachings for optimizing the use of such a dual-H architecture in a practical echo canceller system. For example, the present inventors have recognize that the adaptation gain used to adapt the tap coefficients of the adaptive filter may need to be altered based on certain detected conditions. These conditions include conditions such as double-talk, non-linear echo response paths, high background noise conditions, etc.. The present inventors have recognized the problems associated with the foregoing dual-H architecture and have provided solutions to such conditions.

BRIEF SUMMARY OF THE INVENTION

An echo canceller circuit for use in an echo canceller system is set forth that provides sensitive double-talk detection. The echo canceller circuit comprises a second digital filter having adaptive tap coefficients to simulate an echo response occurring during the call. The adaptive tap coefficients of the second digital filter are updated over the duration of the call using a Least Mean Squares process having an adaptive gain a. A channel condition detector is used to detect channel conditions during the call. The channel condition detector is responsive to detected channel conditions for changing the adaptive gain a during the call. For example, the channel condition detector may detect the presence of a double-talk condition and set the adaptive gain a to zero. Similarly, the channel condition detector may detect the occurrence of a high background noise condition and set the adaptive gain a to a level less than 1 that is dependent on the detected level of the background noise. Other similar channel conditions and corresponding adaptive gain settings may likewise be utilized.

DETAILED DESCRIPTION OF THE INVENTION

Figure 1:
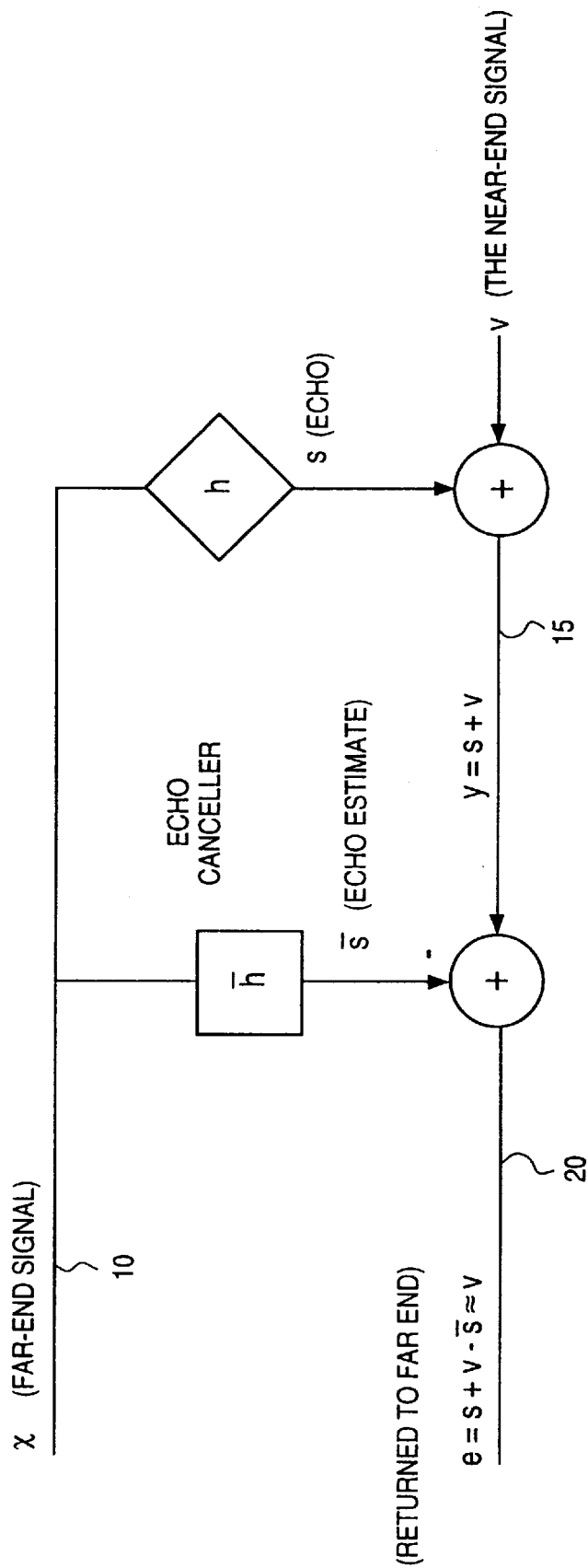
FIG. 1 is a block diagram of a conventional canceller.
Figure 2:
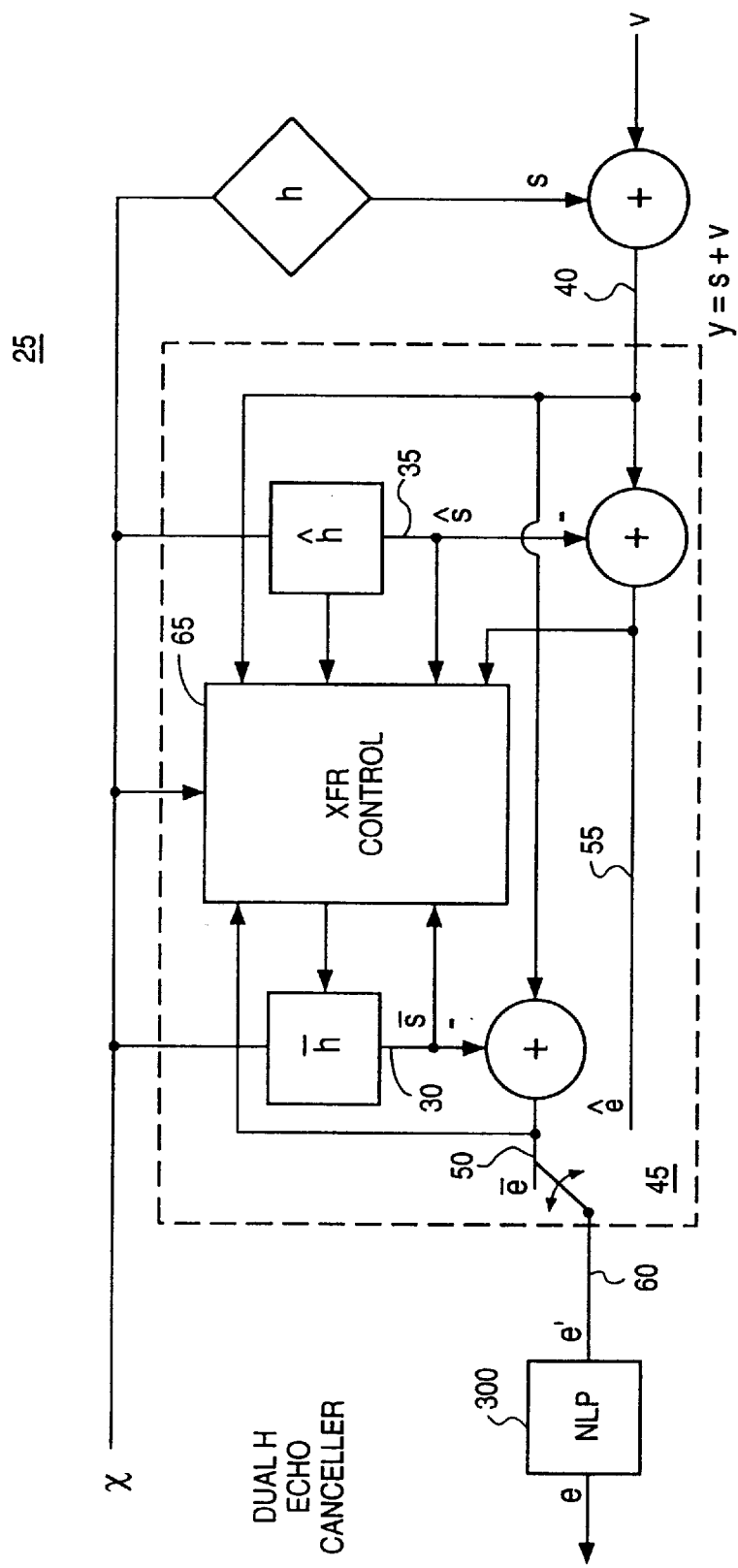
FIG. 2 is a schematic block diagram of an echo canceller that operates in accordance with one embodiment of the present invention.

FIG. 2 illustrates one embodiment of a dual-h echo canceller suitable for use in implementing the present invention. As illustrated, the echo canceller, shown generally at 25, includes both a non-adaptive filter $\overline{h}$ and an adaptive filter $\hat{h}$ to model the echo response h .Each of the filters $\overline{h}$ and $\hat{h}$ are preferably implemented as digital finite impulse response (FIR) filters comprising a plurality of taps each having a corresponding tap coefficient. The duration of each of the FIR filters should be sufficient to cover the duration of the echo response of the channel in which the echo canceller 25 is disposed.

The output of the non-adaptive filter $\overline{h}$ is available at the line 30 while the output of the adaptive filter $\hat{h}$ is available at line 35. Each of the signals at lines 30 and 35 are subtracted from the signal-plus-echo signal of line 40 to generate echo compensated signals at lines 50 and 55, respectively. A switch 45, preferably a software switch, may be used to selectively provide either the output signal at the line 50 or the output signal at line 55 to the echo canceller output at line 60.

A transfer controller 65 is used to transfer the tap coefficients of filter $\hat{h}$ to replace the tap coefficients of filter $\overline{h}$. As illustrated, the transfer controller 65 is connected to receive a number of system input signals. Of particular importance with respect to the present invention, the transfer controller 65 receives the signal-plus-echo response y and each of the echo canceller signals e and e at lines 50 and 55, respectively. The transfer controller 65 is preferably implemented in the software of one or more digital signal processors used to implement the echo canceller 25.

As noted above, the art is substantially deficient of teachings with respect to the manner in which and conditions under which a transfer of tap coefficients from $\hat{h}$ to $\overline{h}$ is to occur. The present inventors have implemented a new process and, as such, a new echo canceller in which tap coefficient transfers are only made by the transfer controller 65 when selected criterion are met. The resulting echo canceller 25 has substantial advantages with respect to reduced double-talk sensitivity and increased double-talk detection capability. Further, it ensures a monotonic improvement in the estimates $\overline{h}$.

The foregoing system uses a parameter known as echo-return-loss-enhancement (ERLE) to measure and keep track of system performance. Two ERLE parameter values are used in the determination as to whether the transfer controller 65 transfers the tap coefficients from $\hat{h}$ to $\overline{h}$. The first parameter, $\overline{E}$, is defined in the following manner:

$$\overline{E} = \frac{y}{\overline{e}}$$

Similarly, the parameter $\hat{E}$ is defined as follows:

$$\hat{E} = \frac{y}{\hat{e}}$$

Each of the values $\hat{E}$ and $\overline{E}$ may also be averaged over a predetermined number of samples to arrive at averaged $\hat{E}$ and $\overline{E}$ values used in the system for the transfer determinations.

Figure 3:
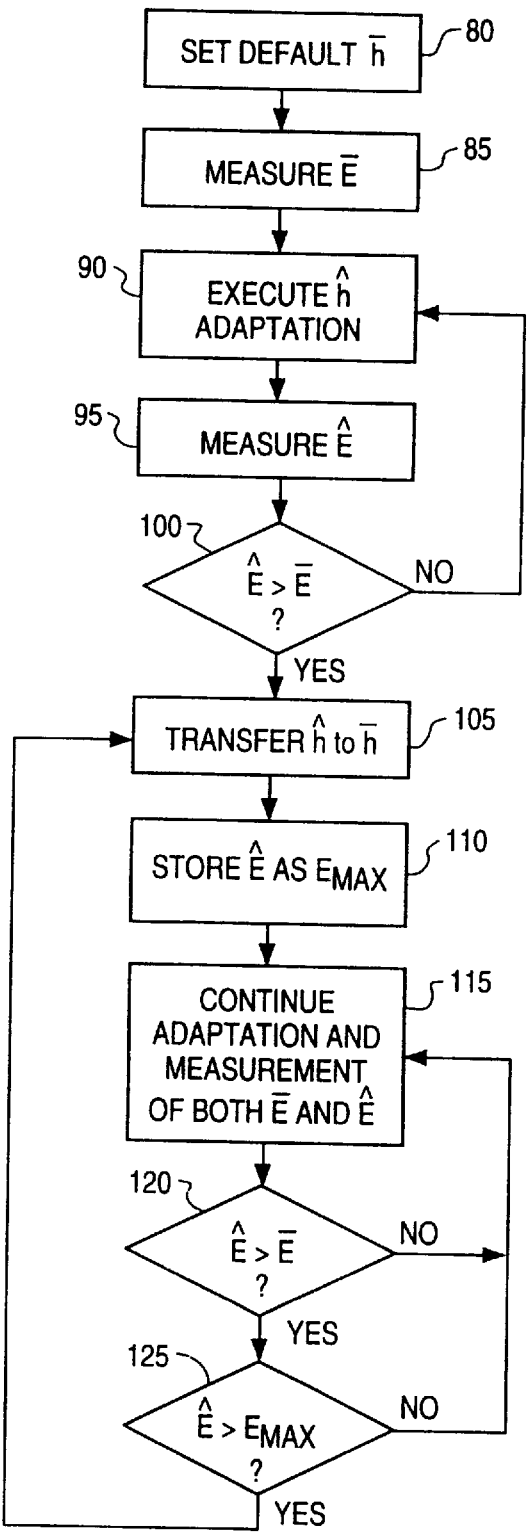
FIG. 3 is a flow chart illustrating one manner of carrying out coefficient transfers wherein the transfer conditions may be used to implement double-talk detection in accordance with one embodiment of the present invention.

FIG. 3 illustrates one manner of implementing the echo canceller 25 using the parameters $\hat{E}$ and $\overline{E}$ to control tap coefficients transfers between filter $\hat{h}$ to $\overline{h}$. As illustrated, the echo canceller 25 provides a default $\overline{h}$ set of coefficients at step 80 during the initial portions of the call. After the tap coefficients values for $\overline{h}$ have been set, a measure of $\overline{E}$ is made at step 85 to measure the performance of the tap coefficient values of filter $\overline{h}$.

After the initialization sequence of steps 80 and 85, or concurrent therewith, the echo canceller 25 begins and continues to adapt the coefficients of $\hat{h}$ to more adequately match the echo response h of the overall system. As noted in FIG. 3, this operation occurs at step 90. Preferably, the adaptation is made using a Normalized Least Mean Squares method, although other adaptive methods may also be used (e.g., LMS and RLS).

After a period of time has elapsed, preferably, a predetermined minimum period of time, the echo canceller 25 makes a measure of $\hat{E}$ at step 95. Preferably, this measurement is an averaged measurement. At step 100, the echo canceller 25 compares the value of $\hat{E}$ with the value of $\overline{E}$. If the value of $\hat{E}$ is greater than the value of $\overline{E}$, the tap coefficients of filter $\hat{h}$ are transferred to replace the tap coefficients of filter $\overline{h}$ at step 105. If this criterion is not met, however, the echo canceller 25 will continue to adapt the coefficients of the adaptive filter $\hat{h}$ at step 90, periodically measure the value of $\hat{E}$ at step 95, and make the comparison of step 100 until the condition is met.

If the echo canceller 25 finds that $\hat{E}$ is greater than $\overline{E}$, the above-noted transfer takes place. Additionally, the echo canceller 25 stores the value of $\hat{E}$ as a value $E_{max}$. This operation is depicted as step 110 of the FIG. 3. The value of $E_{max}$ is thus the maximum value of ERLE that occurs over the duration of the call and at which a transfer has taken place. This further value is used thereafter, in addition to the $\hat{E}$ and $\overline{E}$ comparison, to control whether the tap coefficients of $\hat{h}$ are transferred by the transfer controller 65 to replace the tap coefficients of $\overline{h}$. This further process is illustrated that steps 115, 120, and 125 of FIG. 3. In each instance, the tap coefficient transfer only occurs when both of the following two conditions are met: 1) $\hat{E}$ is greater than the current $\overline{E}$, and 2) $\hat{E}$ is greater than any previous value of $\overline{E}$ used during the course of the call. ($\hat{E}$ is greater than $E_{max}$). Each time that both criteria are met, the transfer controller 65 of echo canceller 25 executes the tap coefficient transfer and replaces the previous $E_{max}$ value with the current $\hat{E}$ value for future comparison.

Requiring that $\hat{E}$ is greater than any $\overline{E}$ value used over the course of the call before the coefficient transfer takes place has two beneficial and desirable effects. First, each transfer is likely to replace the prior tap coefficients of filter $\overline{h}$ with a better estimate of the echo path response. Second, this transfer requirement increases the double-talk protection of the echo canceller system. Although it is possible to have positive ERLE $\hat{E}$ during double-talk, the probability that $\hat{E}$ is greater than $E_{max}$ during double-talk decreases as the value of $E_{max}$ increases. Thus an undesirable coefficient transfer during double-talk becomes increasingly unlikely as the value of $E_{max}$ increases throughout the duration of the call.

The echo canceller 25 may impose both an upper boundary and a lower boundary on the value of $E_{max}$. For example, $E_{max}$ may have a lower bounded value of 6 dB and an upper bounded value of 24 dB. The purpose of the lower bound is to prevent normal transfers during double-talk conditions. It has been shown in simulations using speech inputs that during double-talk, a value of greater than 6 dB ERLE was a very low probability event. The upper bound on $E_{max}$ is used to prevent a spuriously high measurement from setting $E_{max}$ to a value at which further transfers become impossible.

The value of $E_{max}$ should be set to, for example, the lower bound value at the beginning of each call. Failure to do so will prevent tap coefficient transfers on a new call until the echo cancellation response of the echo canceller 25 on the new call surpasses the quality of the response existing at the end of the prior call. However, this criterion may never be met during the subsequent call thereby causing the echo canceller 25 to operate using sub-optimal tap coefficients values. Resetting the $E_{max}$ value to a lower value increases the likelihood that a tap coefficient transfer will take place and, thereby, assists in ensuring that the $\overline{h}$ filter uses tap coefficients for echo cancellation that more closely correspond to the echo path response of the new call.

Figure 4:
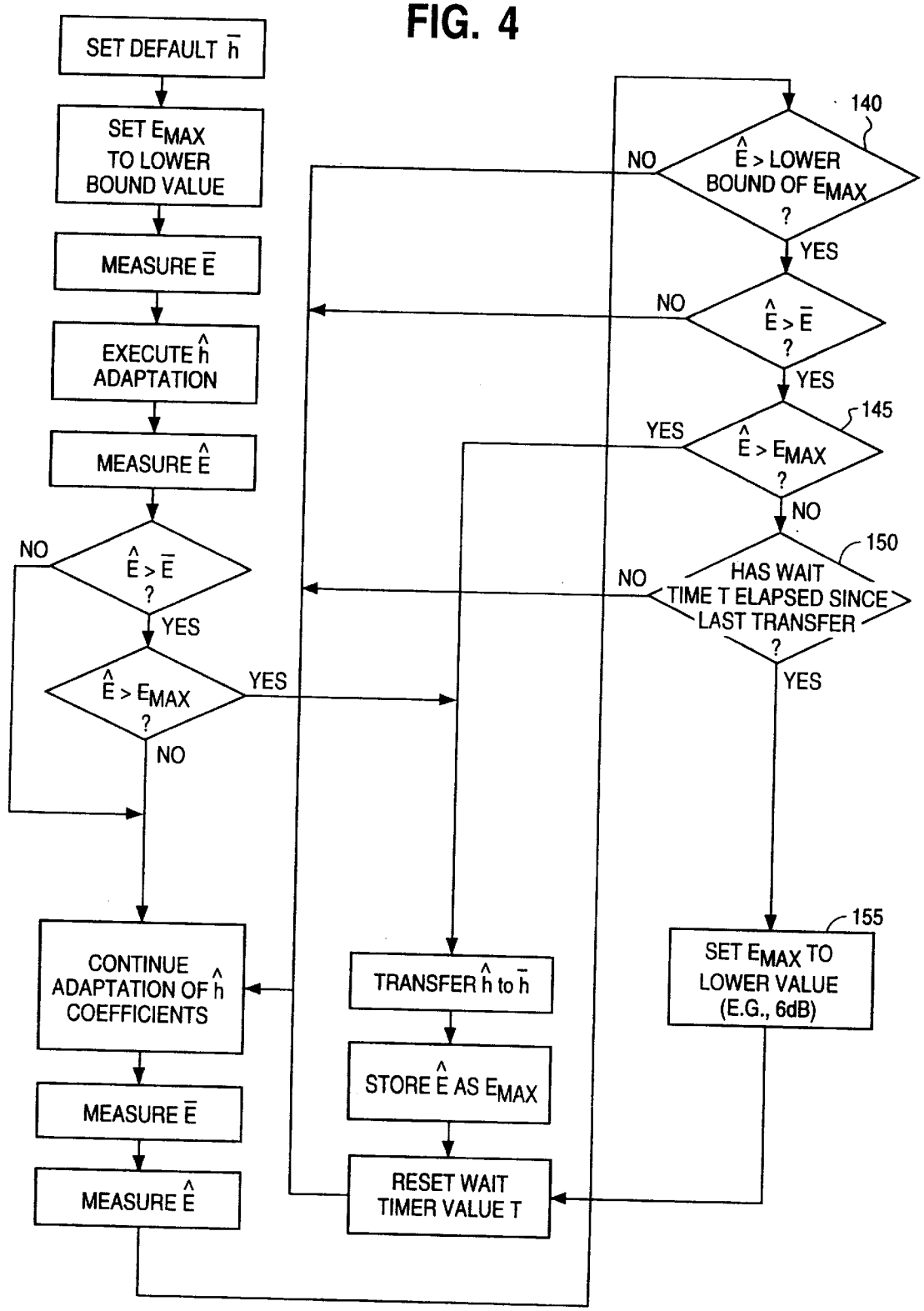
FIG. 4 is a flow chart illustrating a further manner of carrying out coefficient wherein the transfer conditions may be used to implement the double-talk detection an accordance with one embodiment of the present invention.

One manner of implementing the $E_{max}$ value change is illustrated in the echo canceller operations flow-chart of FIG. 4. When all transfer conditions are met except $\hat{E}$ greater than $E_{max}$, and this condition persists for a predetermined duration of time, the echo canceller 25 will reset the $E_{max}$ value to, for example, the lower bound value. In the exemplary operations shown in FIG. 4, the echo canceller 25 determines whether $\hat{E}$ is greater than the lower bound of $E_{max}$ at step 140 and less than the value of $E_{max}$ at step 145. If both of these condition remain true for a predetermined period of time as determined at step 150, and all other transfer criterion have been met, the echo canceller 25 resets the $E_{max}$ value to a lower value, for example, the lower bound of the $E_{max}$ value, at step 155. This lowering of the $E_{max}$ value increases the likelihood of a subsequent tap coefficient transfer.

Choosing values for the lower and upper bound of $E_{max}$ other than 6 dB and 24 dB, respectively, is also possible in the present system. Choosing a lower bound of $E_{max}$ smaller than 6 dB provides for a relatively prompt tap coefficient transfer after a reset operation or a new call, but sacrifices some double-talk protection. A value greater than 6 dB, however, inhibits tap coefficient transfer for a longer period of time, but increases the double-talk immunity of the echo canceller. Similarly, varying the value of the predetermined wait time T before which $E_{max}$ is reset may also be used to tweak echo canceller performance. A shorter predetermined wait time T produces faster reconvergence transfers, but may sacrifice some double-talk immunity. The opposite is true for larger predetermined wait time values.

A further modification of the foregoing echo canceller system relates to the value stored as $E_{max}$ at the instant of tap coefficient transfer. Instead of setting $E_{max}$ equal to the $\hat{E}$ value at the transfer instant, $E_{max}$ may be set to a value equal to the value of $\hat{E}$ minus a constant value (e.g., one, three, or 6 dB). At no time, however, should the $E_{max}$ value be set to a value that is below the lower bound value for $E_{max}$. Additionally, a further condition may be imposed in that a new softened $E_{max}$ is not less than the prior value of $E_{max}$. The foregoing "softening" of the $E_{max}$ value increases the number of transfers that occur and, further, provides more decision-making weight to the condition of $\hat{E}$ being larger than $\overline{E}$. Further details with respect to the operation of the echo canceller coefficient transfer process are set forth and the co-pending patent application titled "ECHO CANCELLER HAVING THE IMPROVED TAP COEFFICIENT TRANSFER", filed on even date herewith.

Preferably, the adaptive filter $\hat{h}$ uses a Normalized Least Mean Square (NLMS) adaptation process to update its tap coefficients. In accordance with the process, coefficients are adapted at each time n for each tap m=0, 1, . . . , N-1 in accordance with the following equation:

$$\hat{h}_{n+1}(m) = \hat{h}_n(m) + \frac{a_n}{\sum_{i=0}^{N-1} x_i^2} e_n x_{n-m}$$

where $\hat{h}_n(m)$ is the $m^{th}$ tap of the echo canceller, $x_n$ is the far-end signal at time n, $e_n$ is the adaptation error of time n, and $a_n$ is the adaptation gain at time n.

The foregoing adaptation process will converge in the mean-square sense to the correct solution the echo path response h if $0<a_n<2$. Fastest convergence occurs when $a=1$. However, for $0<a\leq1$, the speed of convergence to h is traded-off against steady-state performance.

Figure 5:
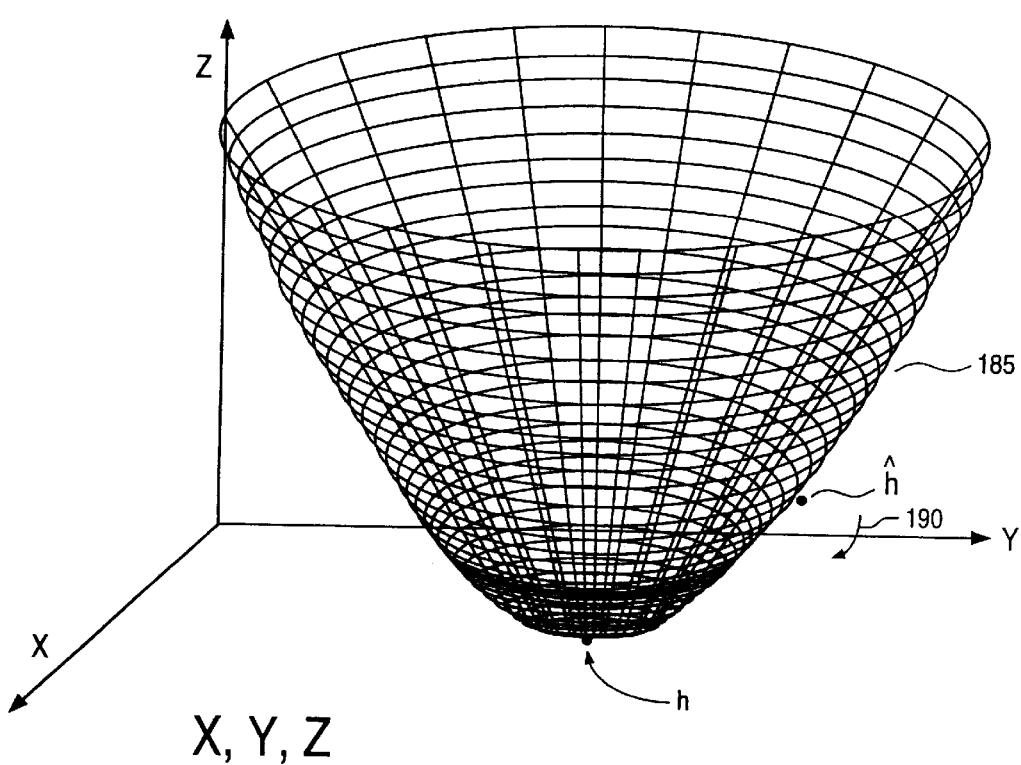
FIG. 5 illustrates an exemplary solution surface for the adaptive filter whereby the desired result is achieved at the solution matching the echo response of the channel.

FIG. 5 is provided to conceptualize the effect of the adaptation gain on the filter response. The graph of FIG. 5 includes an error performance surface 185 defined to be the mean square error between $\hat{h}$ and h, to be a N=3 dimensional bowl. Each point in the bowl corresponds to the mean-square error for each corresponding $\hat{h}$ (of length N). The bottom of the bowl is the $\hat{h}$ which produces the least mean-square error, i.e. h. The NLMS process iteratively moves the $\hat{h}$ towards h at the bottom of the performance surface as shown by arrow 190. When $a=1$, $\hat{h}$ moves to the bottom of the bowl most quickly, but once the bottom is reached, the adaptation process continues to bounce h around the true $\hat{h}$ bottom of the bowl, i.e. $E[\hat{h}]=h$ but $\hat{h}\neq h$. If a small a is used, then the steady-state error is smaller ($\hat{h}$ will remain closer to h), but $\hat{h}$ requires a longer time to descend to the bottom of the bowl, as each step is smaller.

In some cases, as the present inventors have recognized, the performance surface will temporarily change. In such situations, it becomes desirable to suppress the $\hat{h}$ from following these changes. This presents a challenge to choose the best a for each scenario.

Figure 6:
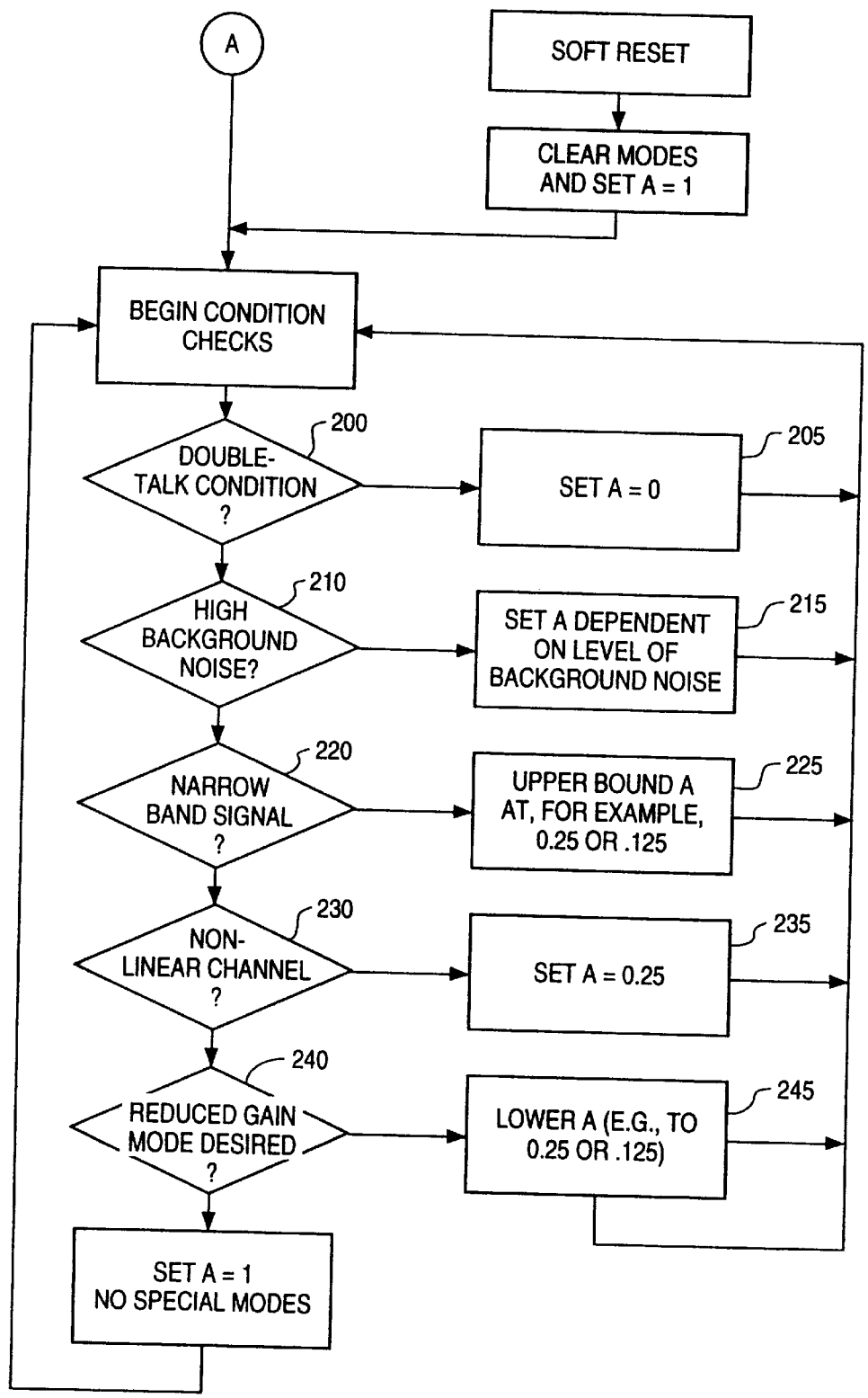
FIG. 6 illustrates one manner of checking for various echo canceller conditions and responding to these conditions using a change in the adaptive gain setting of the adaptive filter of the echo canceller.

FIG. 6 illustrates operation of the echo canceller 25 in response to various detected scenarios. It will be recognized that the sequence of detecting the various conditions that is set forth in FIG. 6 is merely illustrative and may be significantly varied. Further, it will be recognized that the detection and response to each scenario may be performed concurrently with other echo canceller processes. Still further, it will be recognized that certain detected scenarios and their corresponding responses may be omitted.

In the embodiment of FIG. 6, the echo canceller 25 entertains whether or not a double-talk condition exists at step 200. Double talk, as noted above, is defined as the situation when both far-end and near-end talkers speak at the same time during a call. In such a scenario, the adaptive error signal is so severely corrupted by the near-end speaker that it is rendered useless. As such, if a double-talk condition is detected, the echo canceller 25 responds by freezing the adaptation process at step 205, i.e., set $a=0$, until the double talk ceases.

There are several methods that the echo canceller 25 can use for detecting a double-talk condition. One is to compare the power of the near-end signal to the far-end signal. If the near-end power comes close enough to the far-end power ("close enough" can be determined by the system designer, e.g. within 0 or 6 or 10 dB), then double talk can be declared. Another method is to compare the point-by-point magnitudes of the near-end and far-end signals. This search can compare the current $|x|$ with the current $|y|$ the current $|x|$ with the last several $|y|$ the current $|y|$ with the last several $|x|$, etc. In each case, the max $|x|$ and $|y|$ over the searched regions are compared. If $$\frac{\max|y|}{\max|x|} > \text{Double Talk Threshold}$$

where max $|x|$ indicates the maximum $|x|$ over the search region ($|y|$ is similarly defined), then a double-talk condition is declared.

A still further manner of detecting a double-talk condition is set forth in Ser. No. 08/971,116, titled "Echo Canceller Employing Dual-H Architecture Having Improved Double-Talk Detection", the teachings of which are hereby incorporated by reference. As set forth in that patent application, a double-talk condition is declared based on certain monitored filter performance parameters.

It may be possible to further condition the double-talk declaration with other measurements. For example, the current Echo Return Loss (ERL) may be used to set the Double Talk Threshold noted above herein. The short-term power of either the far-end, the near-end, or both, may also be monitored to ensure that they are larger than some absolute threshold (e.g. −5 OdBm or −4 OdBm). In this manner, a double-talk condition is not needlessly declared when neither end is speaking.

Once a double-talk condition is declared, it may be desirable to maintain the double-talk declaration for a set period time after the double talk condition is met. Examples might be 32, 64, or 96 msec. After the double-talk condition ceases to exist, the adaptive gain value may be returned to the value that existed prior to the detection of the double-talk condition, or to a predetermined return value.

At step 210, the echo canceller 25 determines whether a high background noise condition is present. A low level of constant background noise can enter from the near-end, for example, if the near-end caller is in an automobile or an airport. Its effects are in some ways similar to that of double-talk, as the near-end double-talk corrupts the adaptive error signal. The difference is that, unlike double talk, near-end background noise is frequently constant, thus setting $a=0$ until the noise ends is not particularly advantageous. Also background noise is usually of lower power than double-talk. As such, it corrupts the adaptation process but does not render the resulting adaptation coefficients unusable.

As illustrated at step 215, it is desirable to choose a gain $0<a<1$, i.e. lower the gain from its fastest value of 1 when a high background noise condition is present. While this will slow the adaptation time, the steady state performance increases since the effects of noise-induced perturbations will be reduced. In other words, the tap variance noise is reduced by lowering the adaptation gain a.

Preferably, the background noise is measured as a long-term measurement of the power of when the far-end is silent. As this measurement increases, a decreases. One schedule for setting the adaptive gain a as a function of background noise level is set forth below.

| Background Noise (dBm) | a |
| --- | --- |
| > −48 | .125 |
| > −54 ≧ −48 | .25 |
| > −60 ≧ −54 | .5 |
| < −60 | 1 |

It will be readily recognized that there are other schedules that would work as well, the foregoing schedule being illustrative.

A further condition in which the adaptive gain may be altered from an otherwise usual gain value occurs when the adaptive filter $\hat{h}$ is confronted with a far-end signal that is narrow band, i.e. comprised of a few sinusoids. In such a scenario, there are an infinite number of equally optimal solutions that the LMS adaptation scheme can find. Thus it is quite unlikely that the resulting cancellation solution $\hat{h}$ will properly identify (i.e. mirror) the channel echo response h. Such a situation is referred to as under-exciting the channel, in that the signal only provides information about the channel response at a few frequencies. The echo canceller 25 attempts to determine the existence of this condition that step 220.

Consider a situation where the far-end signal varies between periods in which a narrow band signal is transmitted and wide band signal is transmitted. During the wide band signal periods, the ĥ filter should adapt to reflect the impulse response of the channel. However, when the narrow band signal transmission period begins, the ĥ filter will readapt to focus on canceling the echo path distortion only at the frequencies present in the narrow band signal. Optimizing a solution at just a few frequencies is likely to give a different solution than was found during transmission of the wide band signal. As a result, any worthwhile adaptation channel information gained during wide band transmission periods is lost and the ĥ filter requires another period of adaptation once the wide band signal returns.

When the far-end signal is narrow band, the adaptation can and should be slowed considerably, which should discourage the tendency of the coefficients to diverge. Specifically, when a narrow band signal is detected, a may be upper-bounded by either 0.25 or 0.125. This operation is illustrated at step 225.

Narrow band signal detection may be implemented using a fourth order predictive filter. Preferably, this filter is implemented in software executed by one or more digital signal processors used in the echo canceller system 25. If it is able to achieve a prediction gain of at least 3 to 6 dB (user defined) over the ĥ filter, then it is assumed that the received signal is a narrow band signal.

An amplitude threshold for the far-end signal is also preferably employed in determining the existence of a narrow band signal. If the far-end power is greater than −40 dBm, the current far-end sample is sent to the fourth order predictive filter, which determines whether or not the far-end signal is narrow band. If the far-end power is less than −40 dBm, the predictive filter is re-initialized to zero.

A further scenario in which it is desirable to alter the gain of the adaptive filter ĥ is when the echo path response is non-linear. The presence of non-linearities in the echo path encourages constant minor changes in the coefficients ĥ in order to find short-term optimal cancellation solutions. The detection of non-linearity of the echo path response preferably proceeds in the manner set forth in Ser. No. 08/970,228, titled "Echo Canceller Employing Dual-H Architecture Having Improved Non-Linear Echo Path Detection" filed on even date herewith. The presence of a non-linear echo path is determined that step 230.

In a non-linear echo path scenario, it is desirable to choose the adaptive gain constant a large enough that ĥ can track these short-term best solutions. However, choosing a=1 may be suboptimal in most non-linear scenarios. This is due to the fact that the gain is too large and, thus, short-term solutions are "overshot" by the aggressive adaptation effort. Accordingly, as shown at step 235, choosing a gain lower than 1 is preferable. Choosing a=0.25 was found to be the best trade off between tracking and overshooting short term optimal solutions. The gain constant a may be further reduced if large background noise is measured, as discussed above.

A still further scenario in which the adaptive gain may be varied relates to the convergence period of the adaptive filter ĥ. As noted above, a large gain constant a is desired during convergence periods while a smaller a is desired in steady state conditions after the filter has converged. In other words, there seems little lost and perhaps some potential gain to reduce a after an initial period of convergence is completed. This appears to be especially valuable if the long-term performance is found to be substandard.

In view of the foregoing, the echo canceller 25 may implement a reduced gain mode in which an upper bound for the gain constant a is set at a lower value than I (e.g., at either 0.25 or 0.125). This mode is detected at step 240 and is entered at step 245 if the ERLE remains below a predetermined threshold value (e.g., either 6 dB or 3 dB) after a predetermined period of adaptation. The adaptation time is preferably selected as a value between 100 to 300 msec. This amount of time will generally prevent the echo canceller 25 from entering the reduced gain mode during convergence periods.

As will be readily recognized, the echo canceller of the present invention may be implemented in a wide range of manners. Preferably, the echo canceller system is implemented using one or more digital signal processors to carry out the filter and transfer operations. Digital-to-analog conversions of various signals are carried out in accordance with known techniques for use by the digital signal processors.

Figure 7:
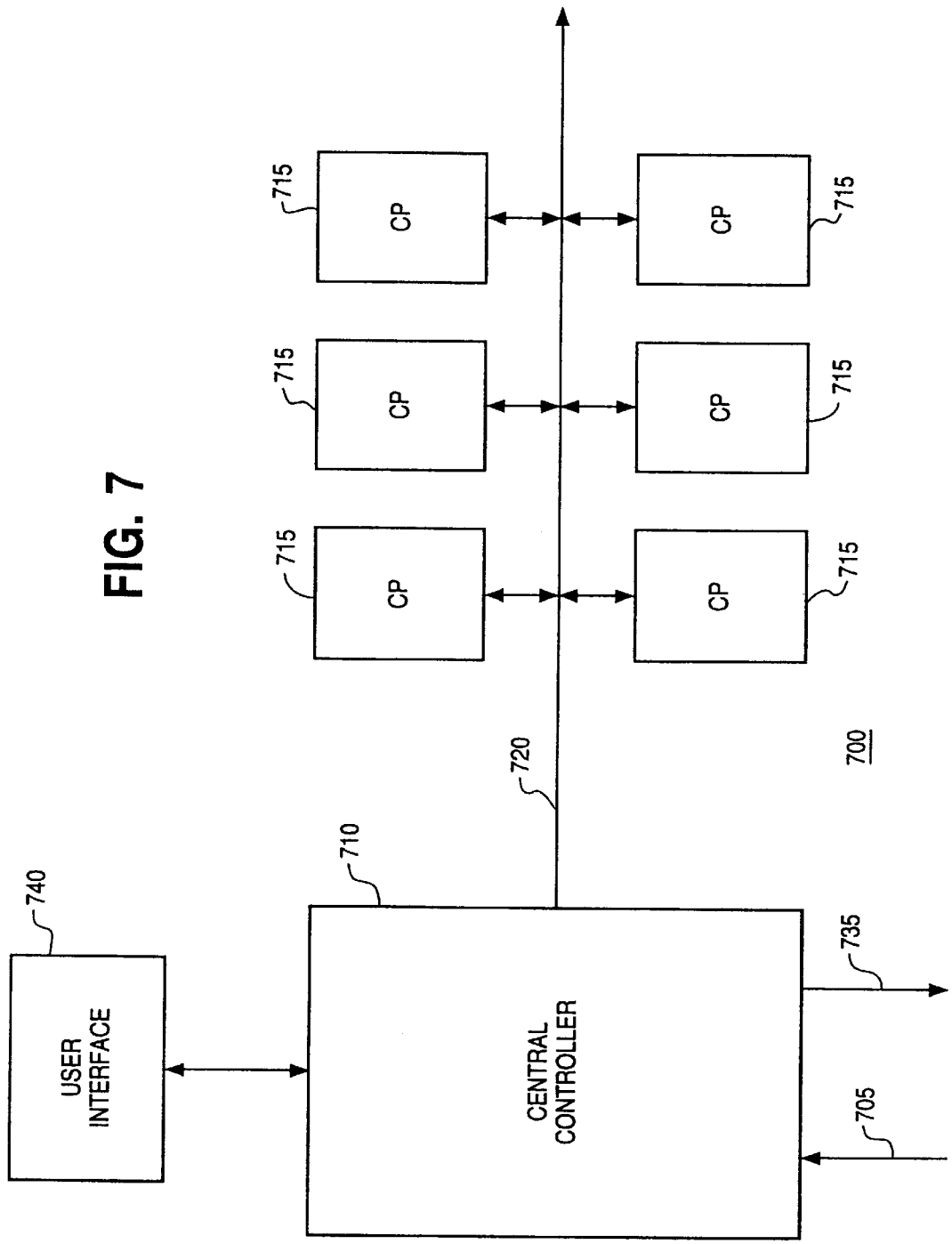
FIG. 7 illustrates one manner of implementing an echo canceller system employing the present invention.

FIG. 7, illustrates one embodiment of an echo canceller system, shown generally at 700, that maybe used to cancel echoes in multi-channel communication transmissions. As illustrated, the system 700 includes an input 705 that is connected to receive a multi-channel communications data, such as a T1 transmission. A central controller 710 deinterleaves the various channels of the transmission and provides them to respective convolution processors 715 over a data bus 720. It is within the convolution processors 715 that a majority of the foregoing operations take place. Each convolution processor 715 is designed to process at least one channel of the transmission at line 730. After each convolution processor 715 has processed its respective channel(s), the resulting data is placed on the data bus 720. The central controller 710 multiplexes the data into the proper multi-channel format (e.g., T1) for retransmission at line 735. User interface 740 is provided to set various user programmable parameters of the system.

Numerous modifications may be made to the foregoing system without departing from the basic teachings thereof. Although the present invention has been described in substantial detail with reference to one or more specific embodiments, those of skill in the art will recognize that changes may be made thereto without departing from the scope and spirit of the invention as set forth in the appended claims.

We claim:

1. An echo canceller circuit comprising:
    a digital filter having adaptive tap coefficients to simulate an echo response occurring during a call, the adaptive tap coefficients being updated during the call using a Least Mean Squares process having an adaptive gain; and
    a channel condition detector responsive to detected channel conditions for changing the adaptive gain during the call wherein the channel condition detector is responsive to a high background noise channel condition and lowers the adaptive gain in response thereto.

2. An echo canceller circuit as claimed in claim 1 wherein the channel condition detector is responsive to a high background noise channel condition and lowers the adaptive gain to a value that is dependant on a level of the background noise that is detected.

3. An echo canceller circuit comprising:
    a digital filter having adaptive tap coefficients to simulate an echo response occurring during a call, the adaptive tap coefficients being updated during the call using a Least Mean Squares process having an adaptive gain; and a channel condition detector responsive to detected channel conditions for changing the adaptive gain during the call wherein the channel condition detector is responsive to a narrow band signal condition and lowers the adaptive gain in response thereto.

4. An echo canceller circuit as claimed in claim 3 wherein the adaptive gain is set equal to about or less than 0.25.

5. An echo canceller as claimed in claim 3 wherein the adaptive gain is set equal to about or less than 0.125.

6. An echo canceller circuit comprising:

a digital filter having adaptive tap coefficients to simulate an echo response occurring during a call, the adaptive tap coefficients being updated during the call using a Least Mean Squares process having an adaptive gain; and a channel condition detector responsive to detected channel conditions for changing the adaptive gain during the call wherein the channel condition detector is responsive to a non-linear echo path condition and lowers the adaptive gain in response thereto.

7. An echo canceller circuit as claimed in claim 6 wherein the adaptive gain is set equal to or less than 0.25.

8. An echo canceller circuit comprising:

a digital filter having adaptive tap coefficients to simulate an echo response occurring during a call, the adaptive tap coefficients being updated during the call using a Least Mean Squares process having an adaptive gain; and a channel condition detector responsive to detected channel conditions for changing the adaptive gain during the call wherein the channel condition detector is responsive to substandard performance of said echo canceller circuit and lowers the adaptive gain in response thereto.

9. An echo canceller circuit as claimed in claim 8 wherein the adaptive gain is set equal to or less than 0.25.

10. An echo canceller circuit as claimed in claim 8 wherein the adaptive gain is set equal to about or less than 0.125.

11. An echo canceller comprising:

at least one input for receiving a far-end signal of a call;

at least one input for receiving a signal-plus-echo signal of the call, the signal-plus-echo signal having a signal component corresponding to an echo response of a transmission medium carrying the call;

a first digital filter receiving the far-end signal and having non-adaptive tap coefficients to simulate the echo response;

a summer circuit for subtracting the filtered far-end output signal of the first digital filter from the signal-plus-echo signal to generate an echo compensated signal for transmission to a far-end;

a second digital filter receiving the far-end signal and having adaptive tap coefficients to simulate the echo response, the adaptive tap coefficients being updated during the call using a Least Mean Squares process having an adaptive gain;

a coefficient transfer controller disposed to transfer the adaptive tap coefficients of the second digital filter to replace the tap coefficients of the first digital filter when $\hat{E}$ is greater than $\bar{E}$ and, concurrently, $\hat{E}$ is greater than $E_{max}$, wherein $\bar{E}$ corresponds to the ratio between a signal-plus-echo-signal and a first echo compensated signal using the first digital filter, $\hat{E}$ corresponds to the ratio between a signal-plus-echo signal and a second echo compensated signal using second digital filter, and $E_{max}$ corresponds to the largest $\hat{E}$ occurring over a call during which a transfer has occurred: and a channel condition detector responsive to detected channel conditions for changing the adaptive gain during the call.

12. An echo canceller comprising:

at least one input for receiving a far-end signal of a call:

at least one input for receiving a signal-plus-echo signal of the call, the signal-plus-echo signal having a signal component corresponding to an echo response of a transmission medium carrying the call;

a first digital filter receiving the far-end signal and having non-adaptive tap coefficients to simulate the echo response;

a summer circuit for subtracting the filtered far-end output signal of the first digital filter from the signal-plus-echo signal to generate an echo compensated signal for transmission to a far-end;

a second digital filter receiving the far-end signal and having adaptive tap coefficients to simulate the echo response, the adaptive tap coefficients being updated during the call using a Least Mean Squares process having an adaptive gain;

a coefficient transfer controller disposed to transfer the adaptive tap coefficients of the second digital filter to replace the tap coefficients of the first digital filter when a set of one or more conditions are met; and a channel condition detector responsive to detected channel conditions for changing the adaptive gain during the call wherein the channel condition detector is responsive to a high background noise channel condition and lowers the adaptive gain in response thereto.

13. An echo canceller comprising:

at least one input for receiving a far-end signal of a call;

at least one input for receiving a signal-plus-echo signal of the call, the signal-plus-echo signal having a signal component corresponding to an echo response of a transmission medium carrying the call;

a first digital filter receiving the far-end signal and having non-adaptive tap coefficients to simulate the echo response;

a summer circuit for subtracting the filtered far-end output signal of the first digital filter from the signal-plus-echo signal to generate an echo compensated signal for transmission to a far-end;

a second digital filter receiving the far-end signal and having adaptive tap coefficients to simulate the echo response, the adaptive tap coefficients being, updated during the call using a Least Mean Squares process having an adaptive gain;

a coefficient transfer controller disposed to transfer the adaptive tap coefficients of the second digital filter to replace the tap coefficients of the first digital filter when a set of one or more conditions are met; and a channel condition detector responsive to detected channel conditions for changing the adaptive gain during the call wherein the channel condition detector is responsive to a high background noise channel condition and lowers the adaptive gain to a value that is dependent on a level of the background noise that is detected.

14. An echo canceller comprising:

at least one input for receiving a far-end signal of a call;

at least one input for receiving a signal-plus-echo signal of the call, the signal-plus-echo signal having a signal component corresponding to an echo response of a transmission medium carrying the call:

a first digital filter receiving the far-end signal and having non-adaptive tap coefficients to simulate the echo response;

a summer circuit for subtracting the filtered far-end output signal of the first digital filter from the signal-plus-echo signal to generate an echo compensated signal for transmission to a far-end;

a second digital filter receiving the far-end signal and having adaptive tap coefficients to simulate the echo response, the adaptive tap coefficients being updated during the call using a Least Mean Squares process having an adaptive gain;

a coefficient transfer controller disposed to transfer the adaptive tap coefficients of the second digital filter to replace the tap coefficients of the first digital filter when a set of one or more conditions are met; and a channel condition detector responsive to detected channel conditions for changing the adaptive gain during the call wherein the channel condition detector is responsive to a narrow band signal condition and lowers the adaptive gain in response thereto.

15. An echo canceller as claimed in claim 14 wherein the adaptive gain is set equal to about or less than 0.25.

16. An echo canceller as claimed in claim 15 wherein the adaptive gain is set equal to about or less than 0.125.

17. An echo canceller comprising:

at least one input for receiving a far-end signal of a call;

at least one input for receiving a signal-plus-echo signal of the call, the signal-plus-echo signal having a signal component corresponding to an echo response of a transmission medium carrying the call;

a first digital filter receiving the far-end signal and having non-adaptive tap coefficients to simulate the echo response;

a summer circuit for subtracting the filtered far-end output signal of the first digital filter from the signal-plus-echo signal to generate an echo compensated signal for transmission to a far-end;

a second digital filter receiving the far-end signal and having adaptive tap coefficients to simulate the echo response, the adaptive tap coefficients being updated during the call using a Least Mean Squares process having an adaptive gain;

a coefficient transfer controller disposed to transfer the adaptive tap coefficients of the second digital filter to replace the tap coefficients of the first digital filter when a set of one or more conditions are met; and a channel condition detector responsive to detected channel conditions for changing the adaptive gain during the call wherein the channel condition detector is responsive to a non-linear echo path condition and lowers the adaptive gain in response thereto.

18. An echo canceller as claimed in claim 17 wherein the adaptive gain is set equal to about or less than 0.25.

19. An echo canceller comprising:

at least one input for receiving a far-end signal of a call;

at least one input for receiving a signal-plus-echo signal of the call, the signal-plus-echo signal having a signal component corresponding to an echo response of a transmission medium carrying the call;

a first digital filter receiving the far-end signal and having non-adaptive tap coefficients to simulate the echo response;

a summer circuit for subtracting the filtered far-end output signal of the first digital filter from the signal-plus-echo signal to generate an echo compensated signal for transmission to a far-end;

a second digital filter receiving the far-end signal and having adaptive tap coefficients to simulate the echo response, the adaptive tap coefficients being updated during the call using a Least Mean Squares process having an adaptive gain;

a coefficient transfer controller disposed to transfer the adaptive tap coefficients of the second digital filter to replace the tap coefficients of the first digital filter when a set of one or more conditions are met; and a channel condition detector responsive to detected channel conditions for changing the adaptive gain during the call wherein the channel condition detector is responsive to substandard performance of said echo canceller and lowers the adaptive gain in response thereto.

20. An echo canceller as claimed in claim 19 wherein the adaptive gain is set equal to or less than 0.125.

21. An echo canceller as claimed in claim 19 wherein the adaptive gain is set equal to about or less than 0.125.

* * * * *

UNITED STATES PATENT AND TRADEMARK OFFICE
CERTIFICATE OF CORRECTION

PATENT NO.   : 6,031,908                              Page 1 of 1
DATED        : February 29, 2000
INVENTOR(S)  : K. Laberteaux, R. Younce, B. Dunne, D. Farrell It is certified that error appears in the above-identified patent and that said Letters Patent is hereby corrected as shown below:

Column 4,
Line 23, the phrase " e and e" should read -- $\bar{e}$ and $\hat{e}$ --.

Column 8,
Line 11, the phrase "-5 0dBm or –4 0dBm" should read -- -50 dBm or –40 dBm --.

Signed and Sealed this

Fifth Day of March, 2002

Attest:

Attesting Officer

JAMES E. ROGAN
Director of the United States Patent and Trademark Office